3,428,702
**DEHYDROCYCLIZATION OF 2,5-DIMETHYL-
HEXENE TO PARA-XYLENE**
Ronald O. Downs, St. Louis, and Raymond A. Franz, Kirkwood, Mo., assignors to Monsanto Company, St. Louis, Mo., a corporation of Delaware
No Drawing. Filed Oct. 14, 1966, Ser. No. 586,619
U.S. Cl. 260—673.5          10 Claims
Int. Cl. C07c 5/20, 5/24

ABSTRACT OF THE DISCLOSURE

Para-xylene is made in an improved process by contacting 2,5-dimethyl hexene with a dehydrocyclization catalyst under dehydrocyclization conditions in the presence of a modifying agent selected from the group consisting of $H_2S$ or compounds or elements which form $H_2S$ under the reaction conditions.

---

The present invention relates to a process for the preparation of aromatic hydrocarbons. More particularly, the present invention relates to a process for the dehydrocyclization of aliphatic hydrocarbons to produce aromatic hydrocarbons.

It is well known that aliphatic hydrocarbons, both saturated and unsaturated, may be converted through dehydrocyclization into aromatic hydrocarbons. Within this field are many processes whereby certain aromatic hydrocarbons may be produced with high specificity from particular aliphatic hydrocarbon feeds. For example, from the dehydrocyclization of 2,5-dimethylhexane or 2,5-dimethylhexenes, it has been found that para-xylene may be produced almost exclusively with production of little or none of the difficultly separable isomeric xylenes. However, such specific dehydrocyclization processes have as yet found little commercial acceptance, one of the primary reasons being that conversions to and yields of the desired aromatic hydrocarbons generally have been lower than desired.

It is an object of the present invention to provide a new and improved process for the dehydrocyclization of aliphatic hydrocarbons to produce aromatic hydrocarbons. Another object of the present invention is to provide a new and improved process for the dehydrocyclization of aliphatic hydrocarbons to produce para-xylene. An additional object of the present invention is to provide a new and improved process for producing para-xylene with improved conversions and yields by the dehydrocyclization of 2,5-dimethylhexane and/or 2,5-dimethylhexenes. Additional objects will become apparent from the following description of the invention herein disclosed.

The present invention which accomplishes these and other objects, is a dehydrocyclization process which comprises contacting an aliphatic hydrocarbon selected from the group consisting of 2,5-dimethylhexane and 2,5-dimethylhexenes with a dehydrocyclization catalyst under dehydrocyclization conditions of temperature and pressure in the presence of at least one modifying agent selected from the group consisting of $H_2S$ and compounds and elements which under the conditions of the reaction zone will form $H_2S$.

By the process of the present invention, substantially improved conversions to and yields of para-xylene are obtained as compared with those obtainable with known processes. In addition, little or no meta- or ortho-xylenes are produced by the present process. Further, catalyst activity is significantly lengthened through the process of the present invention thereby reducing the off-stream time necessary for catalyst regeneration.

In order to further describe as well as to demonstrate the present invention, the following examples are presented. These examples are not to be construed as limiting the present invention.

Example I

A mixture of 2,5-dimethylhexenes to which has been added 400 p.p.m. by weight of benzenethiol as a modifying agent, was passed at a rate of 0.1 mole per minute through a stainless steel reaction tube 4" in length and having an outside diameter of ½". The reaction tube was packed with approximately 9.1 grams of a chromia-alumina dehydrocyclization catalyst in the form of ⅛" pellets. The composition of this catalyst comprised alumina with a surface area of approximately 60 to 80 square meters per gram having 18 to 20% by weight $Cr_2O_3$ deposited thereon. Temperatures within the reaction tube varied from 508 to 615° C. during the course of the run which was of 150 minutes duration. The pressure within the reaction tube was the autogenous pressure of the reactants under the conditions of the reaction zone. The product of the reaction tube was collected from the effluent and analyzed. From this analysis, it was determined that 41% of the 2,5-dimethylhexenes of the feed were converted to para-xylenes. Of the 2,5-dimethylhexenes consumed in the reaction, 63.6% were converted to para-xylene. No meta- or ortho-xylene was detected in the reaction product.

Example II

Example I was substantially repeated with the exception that the temperature ranged from 510 to 524° C. and no modifying agent was added to the feed or to the reaction zone. In this run, a conversion, based on 2,5-dimethylhexene feed, of 34.2% was obtained with a yield, based on 2,5-dimethylhexene consumed, of 42%. No meta- or ortho-xylenes were detected.

Comparison of Examples I and II above illustrate the advantages in conversion and yield which are obtained by the present process. By the process of the present invention, as illustrated in Example I, an increase in conversion of 19.9% and an increase in yield of 49.1% were obtained.

Example III

Example I is substantially repeated with the exception that the modifying agent used is $H_2S$. Both a high conversion to and yield of para-xylene are obtained.

Example IV

Example I is again substantially repeated with the exception that the modifying agent is ethyl mercaptan. Both a high conversion to and yield of para-xylene are obtained.

Example V

Example I is again substantially repated with the exception that the feed to the process is 2,5-dimethylhexane. Both a high conversion to and yield of para-xylene are obtained.

Example VI

Example I is substantially repeated with the exception that the catalyst used is the same as used in Example I with the exception of containing about 3% by weight $K_2O$. Both a high conversion to and yield of para-xylene are obtained.

The aliphatic hydrocarbon feeds useful in the process of the present invention include both 2,5-dimethylhexane and 2,5-dimethylhexenes. The 2,5-dimethylhexenes include all of the bond isomers such as 2,5-dimethylhexene-1, 2,5-dimethylhexene-2 and 2,5-dimethylhexene-3. The preferred feeds to the process of the present invention are the 2,5-dimethylhexenes.

The modifying agents which are used in carrying out the process of the present invention comprise $H_2S$ and compounds and elements which under the conditions of the reaction zone will form $H_2S$. The compounds or elements which under the conditions of the reaction zone will decompose or otherwise form $H_2S$ include virtually any compound or element which, as defined, will form $H_2S$ under such conditions. Included within this group are elemental sulfur, as well as chemical compounds of which sulfur is a part. The compounds which contain sulfur may be either organic or inorganic compounds. If the compound is an organic compound, it may be saturated or unsaturated, aliphatic or aromatic, straight-chain, branched-chain or cyclic in structure. Among the sulfur-bearing compounds useful in the present invention are the following non-limiting examples:

allyl sulfide, benzoyl disulfide, benzyl disulfide, benzyl sulfide, 2-methyl-1-butanethiol, 3-methyl-1-butanethiol, 2-methyl-2-butanethiol, tert-octanethiol, butyl disulfide, butylsulfide, 1,2-ethanedithiol, ethanethiol, ethylene sulfide, ethyl disulfide, ethyl sulfide, furfuryl mercaptan, 1-heptanethiol, 1-hexanethiol, isoamyl disulfide, isoamyl sulfide, isobutyl sulfide, methyl disulfide, methyl sulfide, 2-naphthalenethiol, 1 - naphthalenethiol, 1 - pentanethiol, phenyl disulfide, 1-propanethiol, 2-methyl-1-propanethiol, 2-propanethiol, 2,2'-thiodiethanol, thiophene, acetyl disulfide, benzenesulfonic acid, o-bromo-benzenesulfonic acid, p-bromo-benzenesulfonic acid, p-chloro-benzenesulfonic acid, o-formyl-benzenesulfonic acid, methyl-benzenesulfonic acid, benzyl sulfoxide, 2,2' - dithiophene, butyl sulfate, butyl sulfone, butyl sulfoxide, dithio-carbamic acid, thiol-carbamic acid, thiono-carbamic acid, trithio-carbonic acid, dithiol-carbonic acid, cetyl sulfate, dodecyl sulfate, 1,2-ethanedisulfonic acid, ethionic anhydride, ethyl sulfite, ethyl sulfone, ethyl sulfoxide, ethyl sulfuric acid, methanethiol, methyl sulfoxide, $\beta,\beta'$-dichloroethyl sulfide, 2-bromothiophene, 2-chlorothiophene, 2,5-dimethylthiophene, 2,5-diiodothiophene, 2,3-dimethylthiophene, vinyl sulfide, 1-decanol sulfate, methyl sulfate, methyl sulfite, dichlorophenylphosphine sulfide, bis-($\beta$-dichloroethyl) sulfide, ethyl methyl sulfide, tetradecyl sulfate, thionaphthene, thionaphthenequinone, 2-methylthiophene, 3-methylthiophene, $\alpha$-toluenethiol, sulfur dissolved in dialkyl-alkanolamine As noted from the above compounds, the sulfur-bearing modifying agents may contain such elements other than sulfur as carbon, hydrogen, oxygen, nitrogen, chlorine, bromine, iodine, and the like. Among the preferred modifying agents are $H_2S$ and such compounds which form $H_2S$ in the reaction zone as mercaptans or thiols, both aliphatic and aromatic, thioethers and thiourea. The preferred sulfur-bearing compounds are $H_2S$ and those containing only the additional elements of carbon and/or hydrogen in addition to the sulfur. When using the preferred sulfur-bearing compounds containing carbon and hydrogen, it is generally preferred that they contain no greater than 20 carbon atoms, with those containing less than 10 carbon atoms being preferred.

The amount of modifying agent necessary in carrying out the process of the present invention is such as to cause a molar concentration in the reaction mixture of no less than 0.001 mol percent of $H_2S$. A preferred amount of modifying agent is that amount which will produce a concentration of $H_2S$ in admixture with the aliphatic hydrocarbon feed within the range of 0.01 to 5.0 mol percent. With the preferred modifying agents, the amount of modifying agent usually required to produce the above-defined amounts of $H_2S$ will seldom be below 0.5 mol percent or about 5.0 mol percent of the reaction mixture.

The dehydrocyclization catalysts which may be used in carrying out the process of the present invention include virtually any of those known to the art for the dehydrocyclization of aliphatic hydrocarbons to produce aromatic hydrocarbons. Included within this group are the oxides of metals of Group IV–B, V–B and VI–B of the Periodic Table, such as the oxides of chromium molybdenum, tungsten, vanadium, titanium, zirconium, thioium, cerium, cesium, and the like. In addition to these, the oxides of such other metals as antimony, tin, zinc, iron, selenium, copper, platinum, palladium, nickel and cobalt are also useful in the dehydrocyclization of aliphatic hydrocarbons to aromatic hydrocarbons. These metal oxides may be used alone or in combination with one another as well as deposited on suitable support materials such as alumina, silica-alumina, silica, magnesia, zirconia, bauxite, carbon and the like. Additionally, these metal oxides, whether supported or unsupported, may be used in combination with any of the well-known promoting materials such as the oxides of Group I–A of the Periodic Table, particularly, lithium, potassium, and sodium. Also, the sulfide of the above metals may be used in the dehydrocyclization of aliphatic hydrocarobns and may be used alone or in combination as well as deposited on suitable support materials. The preferred catalysts for use in carrying out the dehydrocyclization process of the present invention are those containing chromium deposited on an alumina support. Preferably, the alumina support is one having a surface area of greater than 30 square meters per gram and having pore diameters of greater than 40 angstroms. Such preferred catalysts may be promoted or unpromoted, but if promoted, or preferably promoted with an oxide of potassium.

Temperatures at which the process of the present invention most often is operated are usually within the range of 300 to 650° C. Preferably, however, the process of the present invention will be operated at a temperature within the range of from approximately 450 to 600° C. Generally, pressures of the process of the present invention are within the range of atmospheric to 50 p.s.i.g. Since within the above ranges, pressure is not particularly critical, it is usually preferred to allow the reaction to go forward under autogenous pressures, that is, the sum of the partial pressures of the reactants within the reaction zone under the conditions employed.

The residence time of the aliphatic hydrocarbons within the reaction zone will usually be not less than 0.05 second nor more than 5 minutes. Preferably, however, the residence time is within the range of 1 to 25 seconds.

The method whereby the modifying agent and the aliphatic hydrocarbon feed are brought into contact with one another is critical only to the extent that there should be thorough, intimate contact between the components. Aliphatic hydrocarbons and modifying agent may be concurrently introduced into the reaction zone which may be a batch container or a reaction chamber designed for continuous flow. If the process of the present invention is carried out as a continuous process, the aliphatic hydrocarbons and the modifying agent may be introduced into contact with one another by concurrent, cross-current, or counter-current flow.

What is claimed is:
1. A process for the dehydrocyclization of aliphatic hydrocarbons which comprises contacting an aliphatic hydrocarbon selected from the group consisting of the 2,5-dimethylhexenes with a dehydrocyclization catalyst under dehydrocyclization conditions of temperature and pressure in the presence of at least one modifying agent selected from the group consisting of $H_2S$ and compounds and elements which under the conditions of the reaction zone will form $H_2S$.

2. The process of claim 1 wherein the modifying agent is $H_2S$.

3. The process of claim 1 wherein the modifying agent is a compound selected from the groups consisting of mercaptans, thioethers and thiourea.

4. The process of claim 1 wherein the modifying agent is a sulfur-bearing compound containing carbon and hydrogen, said compound containing no greater than 20 carbon atoms.

5. The process of claim 1 wherein the amount of modifying agent present is such as to cause a molar concentration in the reaction mixture of no less than 0.001 mol percent of $H_2S$.

6. The process of claim 1 wherein the dehydrocyclization catalyst is selected from the group consisting of the oxides and sulfides of metals selected from the group consisting of the metals of Group IV–B, Group V–B, Group VI–B and mixtures thereof.

7. The catalyst of claim 6 wherein said oxide of a metal is deposited upon a support material selected from the group consisting of alumina, silica-alumina, silica, magnesia, zirconia, bauxite and carbon.

8. The process of claim 1 wherein the temperature is within the range of 300 to 650° C.

9. The process of claim 1 wherein the pressure is within the range of atmospheric to 50 p.s.i.g.

10. The process of claim 1 wherein the residence time of the aliphatic hydrocarbons within the reaction zone is within the range of 0.05 second to 5.0 minutes.

References Cited
UNITED STATES PATENTS

| | | | |
|---|---|---|---|
| 2,317,683 | 4/1943 | Greensfelder | 260—668 |
| 2,898,388 | 8/1959 | Maloney et al. | 260—673.5 |

DELBERT E. GANTZ, *Primary Examiner.*

J. O. MYERS, *Assistant Examiner.*